(12) United States Patent
Kardashov (10) Patent No.: US 10,623,679 B2
(45) Date of Patent: Apr. 14, 2020

(54) PROXIMITY-BASED CAMERA CONFIGURATION

(71) Applicant: FLIR Systems, Inc., Wilsonville, OR (US)

(72) Inventor: Vlad Kardashov, Ontario (CA)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/348,835

(22) Filed: Nov. 10, 2016

(65) Prior Publication Data

US 2017/0064238 A1 Mar. 2, 2017

Related U.S. Application Data

(63) Continuation of application No. PCT/US2015/030220, filed on May 11, 2015.
(Continued)

(51) Int. Cl.
| | |
|---|---|
| *H04N 5/232* | (2006.01) |
| *H04W 4/00* | (2018.01) |
| *G06Q 20/10* | (2012.01) |
| *H04N 21/442* | (2011.01) |
| *H04N 21/4363* | (2011.01) |
| *H04N 5/44* | (2011.01) |

(Continued)

(52) U.S. Cl.
CPC ............ *H04N 5/44* (2013.01); *G06Q 20/102* (2013.01); *H04N 5/23206* (2013.01); *H04N 5/247* (2013.01); *H04N 21/4223* (2013.01); *H04N 21/43637* (2013.01); *H04N 21/44227* (2013.01); *H04W 4/80* (2018.02); *H04W 76/10* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 2006/0208860 A1* | 9/2006 | Park ................ | G06K 7/0008 340/10.2 |
| 2007/0121541 A1 | 5/2007 | Matsuo | |

(Continued)

FOREIGN PATENT DOCUMENTS

WO WO 2006/106393 10/2006

*Primary Examiner* — Mark T Monk
(74) *Attorney, Agent, or Firm* — Haynes and Boone, LLP (57) ABSTRACT

Techniques are disclosed for systems and methods to provide setup, network connection, and/or other operations for network cameras. The operations may be initiated in response to placing a user device having proximity-based communications circuitry in proximity of a camera having proximity-based communications circuitry. The user device and the camera may exchange information responsive to placing the user device in the proximity of the camera. The information may include network information sent from the user device to the camera and/or camera information sent from the camera to the user device. The network information may include information associated with a network. The camera may be connected to the network using the network information. The camera may be added to list of accessible cameras on the user device when the camera is connected to the network. The proximity-based communications circuitry may be Near Field Communications circuitry.

20 Claims, 9 Drawing Sheets

Related U.S. Application Data (60) Provisional application No. 61/992,129, filed on May 12, 2014.

(51) Int. Cl.
  *H04W 76/10* (2018.01)
  *H04W 4/80* (2018.01)
  *H04N 21/4223* (2011.01)
  *H04N 5/247* (2006.01)
  *H04W 8/00* (2009.01)

(56) References Cited

U.S. PATENT DOCUMENTS

| | | | |
|---|---|---|---|
| 2011/0026068 A1* | 2/2011 | Yoshida | H04N 1/00347 |
| | | | 358/1.14 |
| 2012/0155350 A1* | 6/2012 | Wentink | H04W 8/005 |
| | | | 370/311 |
| 2013/0051755 A1* | 2/2013 | Brown | H04N 21/25875 |
| | | | 386/241 |
| 2013/0252547 A1 | 9/2013 | Cho et al. | |
| 2014/0094117 A1* | 4/2014 | Rajendran | H04W 12/04 |
| | | | 455/41.1 |

* cited by examiner

PROXIMITY-BASED CAMERA CONFIGURATION

CROSS-REFERENCE TO RELATED APPLICATIONS

This application is a continuation of International Patent Application No. PCT/US2015/030220 filed May 11, 2015 and entitled "PROXIMITY-BASED CAMERA CONFIGURATION", which is incorporated herein by reference in its entirety.

International Patent Application No. PCT/US2015/030220 filed May 11, 2015 claims priority to and the benefit of U.S. Provisional Patent Application No. 61/992,129 filed May 12, 2014 and entitled "PROXIMITY-BASED CAMERA CONFIGURATION" which is hereby incorporated by reference in its entirety.

TECHNICAL FIELD

One or more embodiments of the invention relate generally to imaging systems and more particularly, for example, to systems and methods for proximity-based interaction with a camera.

BACKGROUND

Cameras have been developed for remotely monitoring an area around or within a location such as a business or a home. These cameras can be connected to a network and a user can receive images from the camera and/or control the camera by interacting with the camera over the network. One of the challenges in providing network cameras that are easy to install and use, as users have come to expect with consumer electronics, is in connecting the camera to the network and to other devices on the network.

Typically, a camera is connected to the network by connecting the camera to a modem or router using an ethernet cable, discovering the camera using a mobile device application or computer-based software, selecting the right network, typing the password, and performing encryption operations. However, these setup operations can be undesirably time consuming and difficult for a typical user. Thus, there is a need in the art for an improved methodology for camera systems that are easier and more adaptable to install and include relatively inexpensive components.

SUMMARY

Techniques are disclosed for systems and methods to provide setup for a network camera in accordance with one or more embodiments. A camera may be provided with setup capabilities using direct communications between the camera and a user device such as a mobile device. Direct communications between the mobile device and the camera may be used to connect the camera to a network. The mobile device may be connected to the network and may, following connection of the camera to the network using the direct communications, communicate with the camera over the network.

According to an embodiment, direct communications between a user device and a camera such as a network camera for setup of the camera may include creating a visual code such as a quick response (QR) code with the mobile device that contains the network information (e.g., by opening a camera system application on the mobile device, entering a wireless network password, and pressing and/or holding a button on the mobile device to generate and/or display the code), capturing an image of the code as displayed on the mobile device with the camera, and extracting the network information and/or other information from the code with the camera. An additional visual code such as a QR code on the camera may be imaged by a camera of the mobile device to obtain camera information such as a unique identifier or model number of the camera.

According to another embodiment, direct communications between a user device and a camera such as a network camera for setup of the camera may include providing a wireless access point (AP) with the camera and connecting the mobile device to the network through the camera access point (e.g., by opening the device settings on the mobile device and connecting to the camera access point, opening a camera system application on the mobile device, accessing camera settings using the application to find a list of available networks, obtaining a service set identifier (SSID) list from the camera, selecting the network, entering a network password, and saving the network access information).

According to an embodiment, direct communications between the mobile device and the camera for setup of the camera may include discovering the camera with the mobile device using Bluetooth® communications between the camera and the mobile device and sending the network information to the discovered camera using the Bluetooth® communications. A visual code such as a QR code on the camera may also be imaged by a camera of the mobile device to obtain camera information such as a unique identifier or model number of the camera or the camera information may be sent from the camera to the mobile device using the Bluetooth® communications.

According to another embodiment, direct communications between a user device and a camera such as a network camera for setup of the camera may include proximity-based communications such as ultrasound communications, Near Field Communications (NFC) or other relatively short range communications that operate when the mobile device is in close proximity to the camera. A camera may be provided with proximity-based communications circuitry such as Near Field Communications (NFC) circuitry, according to an embodiment. Proximity-based communications circuitry may be provided that is operable without user activation and that has two-way communication capabilities. Camera setup operations such as network connection operations for the camera may be performed by touching the camera with a proximity-based communication enabled mobile device or moving the mobile device within the proximity of the camera according to various embodiments.

According to an embodiment, when the mobile device is moved within the proximity of the camera and/or contacts the camera, the mobile device may be instructed to send network connection information and/or other information such as a service set identifier (SSID), an encryption type, account information, or other information to the camera. The mobile device may also receive information from the camera while in proximity to the camera. For example, the mobile device may receive a camera identifier (ID) such as a serial number, model number, or other unique ID. Responsive to receiving the information from the camera, the mobile device may add the camera to a list of accessible cameras on the mobile device.

According to one or more embodiments, other interactions with the camera may be performed using the proximity-based communications circuitry. For example, services such as purchases, software updates, or other services may be initiated and/or completed using the proximity-based communications circuitry (e.g., by touching, tapping, or otherwise placing a proximity-based communication enabled mobile device in proximity of the camera). For example, a user may be offered additional camera system hardware, monitoring or maintenance services, etc. and may be provided with the ability to accept the offer and initiate and/or complete payment for the offered hardware or services using the proximity-based communications circuitry.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, systems having cameras such as network cameras are provided. A system may, for example, be a monitoring system having one or more network-connected cameras that are accessible over a network from one or more user devices. Systems and methods are provided for connecting one or more cameras to the network using proximity-based communications.

Figure 1:
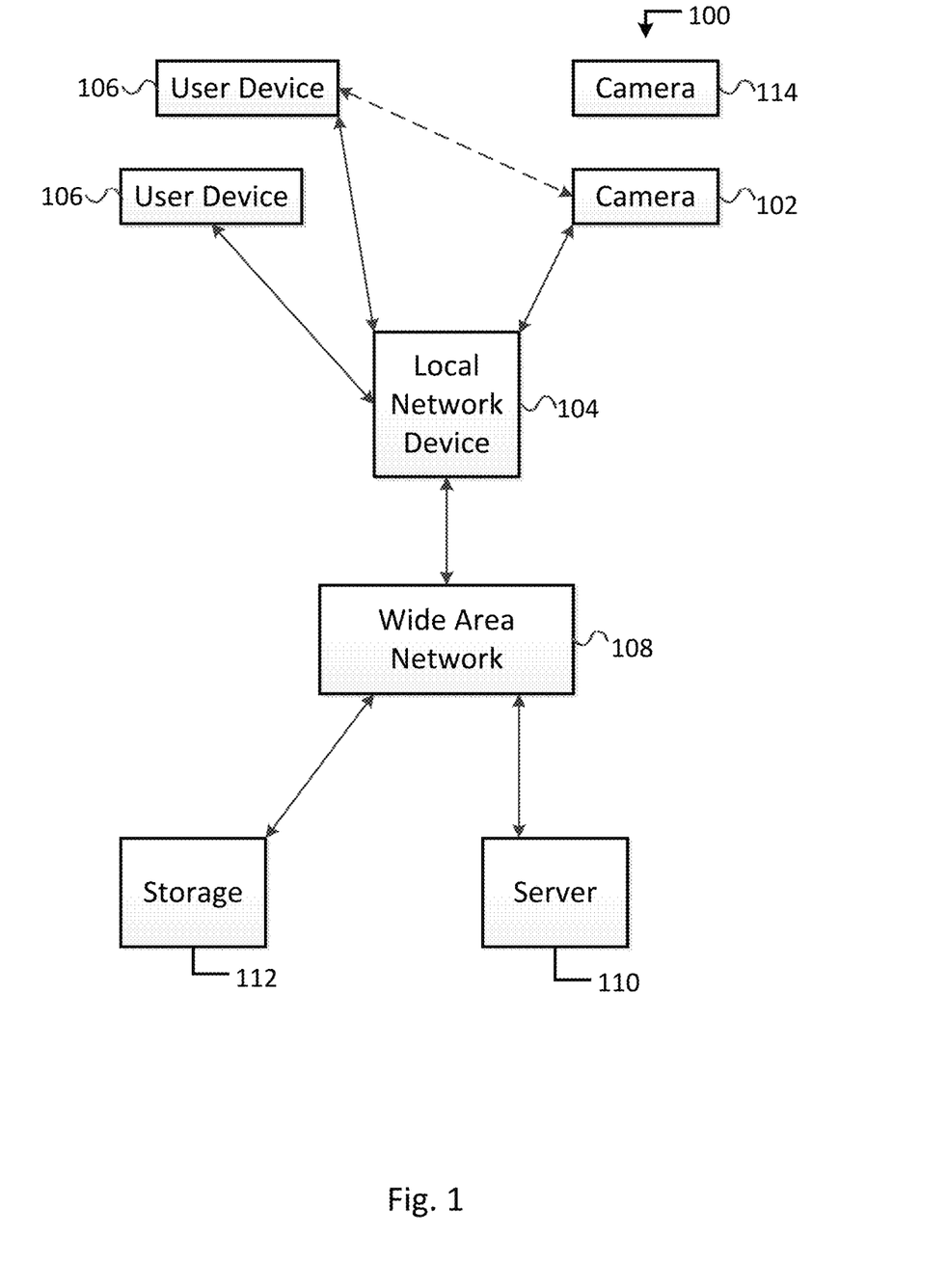
FIG. 1 is an illustrative diagram of a system having one or more network cameras in accordance with an embodiment of the disclosure.

FIG. 1 illustrates a block diagram of a system 100 having cameras in accordance with an embodiment of the disclosure. In the embodiment shown in FIG. 1, system 100 includes a camera 102 connected to a local network device 104. Local network device 104 may be a router or a modem of a wireless local area network (WLAN) such as a home network. Local network device 104 may include one or more antennas and/or other communications circuitry for communication with camera 102 and wired and/or wireless communication with other devices.

System 100 may include one or more user devices such as user device 106. User devices 106 may be computing devices such as desktop computers or mobile computing devices such as mobile phones, tablets, personal digital assistants (PDAs), laptop computers or other computing devices having communications circuitry (e.g., wireless communications circuitry or wired communications circuitry) for connecting with other devices and/or local network device 104.

Camera 102 may communicate with one or more of user devices 106 through local network device 104. However, this is merely illustrative. In some embodiments, camera 102 may communicate directly with one or more of user devices 106 and/or camera 102 may communicate with one or more of user devices 106 through other computing equipment. For example, system 100 may include external computing equipment such as one or more servers such as server 110 and/or remote storage such as storage 112 (e.g., cloud-based storage). As shown, server 110 and storage 112 may communicate with camera 102 and/or user devices 106 through a wide area network 108 (e.g., the internet) and local network device 104 (e.g., a router and/or modem that is communicatively connected to camera 102, user device(s) 106, and wide area network 108).

In some embodiments, local network device 104 may also, or alternatively, include an interface device such as a network video recorder (NVR) device or an NVR interface device or reader device for interacting with an NVR-related server for providing network video recording services for one or more network cameras. Video data and/or other data from one or more cameras 102 may be provided to an NVR storage server (e.g., storage 112 and/or server 110) directly from the cameras or may be routed through an interface device associated with local network device 104.

As shown in FIG. 1, system 100 may include one or more cameras such as camera 114 that are to be connected to a network. For example, camera 114 may be new camera that has not yet been set up for communication with user device(s) 106 and/or other portions of system 100, according to an embodiment. In order to control and/or receive images such as video images from camera 114, a user may desire to connect camera 114 to a network (e.g., a WLAN including local network device 104 and user device(s) 106 and/or a wide area network such as the internet). To facilitate connecting cameras such as cameras 102 and/or 114 to the network, cameras 102 and/or 114 and one or more of user devices 106 may be provided with proximity-based communications capabilities.

Figure 2:
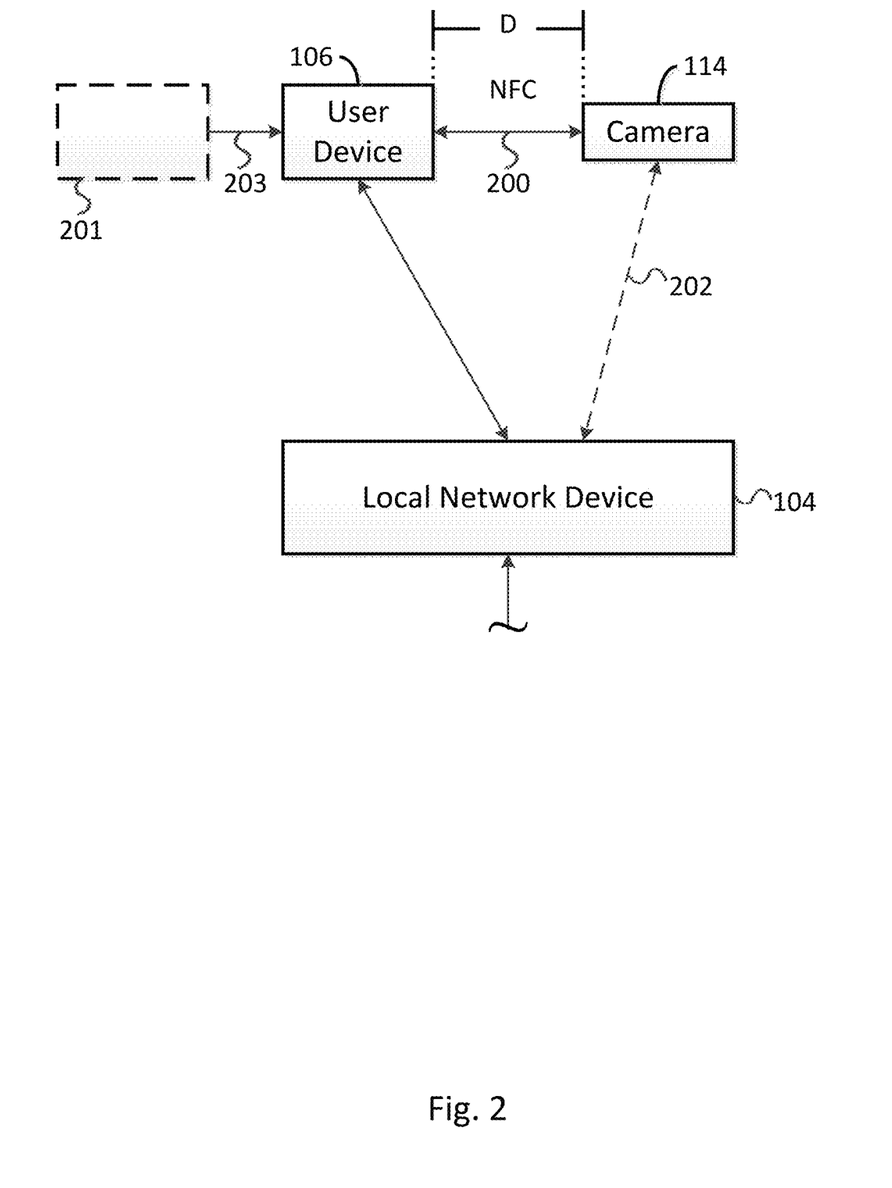
FIG. 2 is an illustrative diagram of a portion of a system having a network camera showing how proximity-based communications may be exchanged between the camera and a mobile device during setup of the camera in accordance with an embodiment of the disclosure.

As shown in FIG. 2, according to an embodiment, camera 114 may be connected to local network device 104 using proximity-based communications 200 (e.g., ultrasound communications, NFC communications, and/or other proximity-based communications) between user device 106 and camera 114. For example, user device 106 (e.g., a mobile device of a user of system 100) may be moved from a position 201 toward camera 114 (e.g., as indicated by arrow 203 of FIG. 2) to within the proximity of camera 114. When user device 106 is within the proximity of camera 114, proximity-based communications circuitry in user device 106 and corresponding proximity-based communications circuitry in camera 114 may be activated and communications 200 may be generated and exchanged. Communications 200 may include one-way or two-way communications between user device 106 and camera 114.

Moving user device 106 into the proximity of camera 114 may include touching user device 106 to camera 114 (e.g., by tapping the camera with the user device) or may include moving user device 106 to within a space within a particular distance D from camera 114. Distance D may be a distance within which a particular type of proximity-based communications circuitry in user device 106 can communicate with a corresponding type of communications circuitry in camera 114. For example, distance D may be substantially equal to one meter, one half meter, 30 centimeters, 20 centimeters, 10 centimeters, 5 centimeters, 1 centimeter, between two inches and three inches, or less than one centimeter (as examples).

When user device 106 is moved within a suitable proximity of camera 114, user device 106 may transmit information such as network information to camera 114 and camera 114 may transmit information such as camera information to user device 106. Network information may include, as examples, a service set identifier (SSID), an encryption type, a network password, a network name, or other information for facilitating connection of the camera to the network. Responsive to receiving the network information via proximity-based communications 200, camera 114 (e.g., a processor of the camera) may establish a connection such as communications link 202 with the network, for example, via local network device 104.

Camera information in communications 200 may include a camera identifier (ID) for camera 114 such as a serial number, model number or other unique ID of the camera. Camera information in communications 200 may also include information associated with server 110 and/or storage 112 (e.g., network addresses, security protocols, or other information for locating, accessing, providing information to, and/or receiving information from one or both of server 110 and/or storage 112).

In one embodiment, user device 106 may provide, via communications 200, information to camera 114 for connecting camera 114 directly to user device 106, even after user device 106 is moved away (e.g., beyond distance D) from camera 114. For example, in addition to, or in place of, communications link 202, camera 114 may establish a Bluetooth® connection directly to user device 106 that can maintain a connection between camera 114 and user device 106 over a relatively wider range of distances than distance D (e.g., within the same room, within the same house or building, within 10 feet, within 100 feet, or within 500 feet) responsive to the exchange of communications 200.

According to various embodiments, communications 200 that are exchanged between user device 106 and camera 114 may include sufficient information such that user device 106 and camera 114 may maintain and/or manage communications during various operating conditions depending on, for example, the signal strength of various types of communications signals. For example, user device 106 may be a smartphone that the user carries from room to room within a house in which camera 114 is located and also carries outside of the house. The connection between user device 106 and camera 114 may be configured to use the information exchanged in communications 200 to move between (as examples) a direct Bluetooth® communications session when the user device and the camera are in the same room, a communications session over a WLAN using local network device 104 when the user device and the camera are within the same house, but not in the same room, and a communications session over a wide area network such as the internet when the user device is carried outside the house.

Proximity-based communications 200 may be communications exchanged between user device 106 and camera 114 using any suitable communications circuitry in the corresponding devices, the operation of which depends on the proximity of the device and the camera. Examples of proximity-based communications circuitry and other components that may be included in user device 106 and camera 114 are shown respectively in FIGS. 3 and 4.

Figure 3:
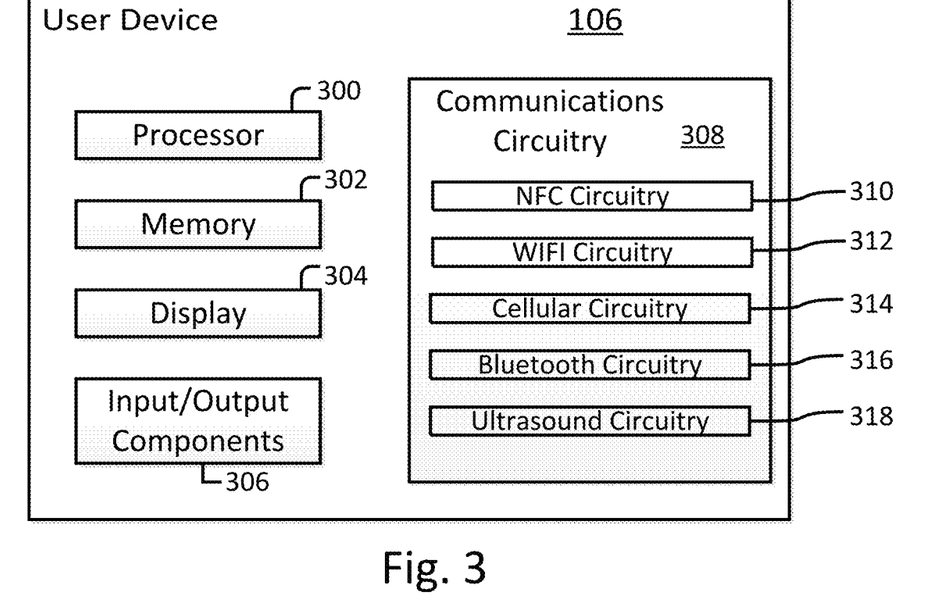
FIG. 3 is a block diagram of an illustrative user device for communicating with a network camera in accordance with an embodiment of the disclosure.

As shown in FIG. 3, according to an embodiment, user device 106 may include components such as processor 300, memory 302, display 304, input/output components 306, and communications circuitry 308. Processor 300 may be implemented as any appropriate processing device (e.g., logic device, microcontroller, processor, application specific integrated circuit (ASIC), or other device) that may be used by user device 106 to execute appropriate instructions, such as software instructions stored in memory 302.

Memory 302 may include one or more memory devices (e.g., memory components) that store data and information, including image data (e.g., including video data), audio data, network information, camera information, account information, and/or other types of sensor data, and/or monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 302 may include a portable memory device that can be removed from user device 106 and used to convey stored data to other systems. In some embodiments, processor 300 may be configured to execute software instructions stored on memory 302 to perform various methods, processes, or operations in the manner described herein.

Display 304 may include any suitable user-viewable display for displaying camera information, images such as video images from one or more network cameras, a camera control interface or other images or information for displaying to a user. For example, display 304 may be a liquid crystal display, a touch-screen display or other type of display. Input/output components 306 may include one or more buttons, indicators (e.g., LEDs), keyboards, trackballs, knobs, joysticks, and/or other type of user interface adapted to accept user input and/or provide user feedback.

As shown in FIG. 3, communications circuitry 308 may include circuitry for communicating with other devices using various communications protocols. As examples, communications circuitry that may be included in a user device may include proximity-based communications circuitry such as, for example, near field communications (NFC) circuitry 310 and/or ultrasound circuitry 318 and optionally relatively wide area communications circuitry such as, for example, wireless network (WiFi®) circuitry 312, cellular circuitry 314, and/or Bluetooth® circuitry 316.

NFC circuitry 310 may include a powered or unpowered NFC integrated circuit that generates, receives, and/or processes communication signals according to radio-frequency identification (RFID) standards such as the ISO/IEC 14443, ISO/IEC 18092 or FeliCa standards (as examples). Cellular circuitry 314 may include a modular cellular component that generates, receives, and/or processes communications signals over one or more cellular data networks. Bluetooth® circuitry 316 may include a wireless communication component that generates, receives, and/or processes communications signals based on, for example, the Bluetooth® standard.

Ultrasound circuitry 318 may include a high-frequency microphone and a high-frequency speaker for sending and receiving sound-based signals at a frequency that is inaudible to the human ear. Ultrasound circuitry 318 may, for example, be implemented as some or all of proximity-based communications circuitry for device 106 that generates ultrasound signals at a volume that can only be detected within a given distance (e.g., within distance D of FIG. 2) of another device such as a camera having corresponding ultrasound communications circuitry. In various embodiments, proximity-based communications circuitry for device 106 may include any suitable combination of NFC circuitry 310, ultrasound circuitry 318, and/or other communications circuitry configured to generate and exchange communications when two or more devices are within close proximity.

In various embodiments, communications circuitry 308 may include other appropriate short range wireless communication standards circuitry, a wireless broadband component (e.g., based on WiMax technologies), a wireless satellite component, or other appropriate wireless communication components. Communications circuitry 308 may also be configured for a proprietary wireless communication protocol and interface based on radio frequency (RF), microwave frequency (MWF), infrared frequency (IRF), and/or other appropriate wireless transmission technologies. Communications circuitry 308 may include one or more antennas for wireless communication purposes. Thus, in one example, communications circuitry 308 may handle, manage, or otherwise facilitate wireless communication by establishing wireless communication links to a wireless router, hub, or other appropriate wireless devices.

Communications circuitry 308 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 308. Communications circuitry 308 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Figure 4:
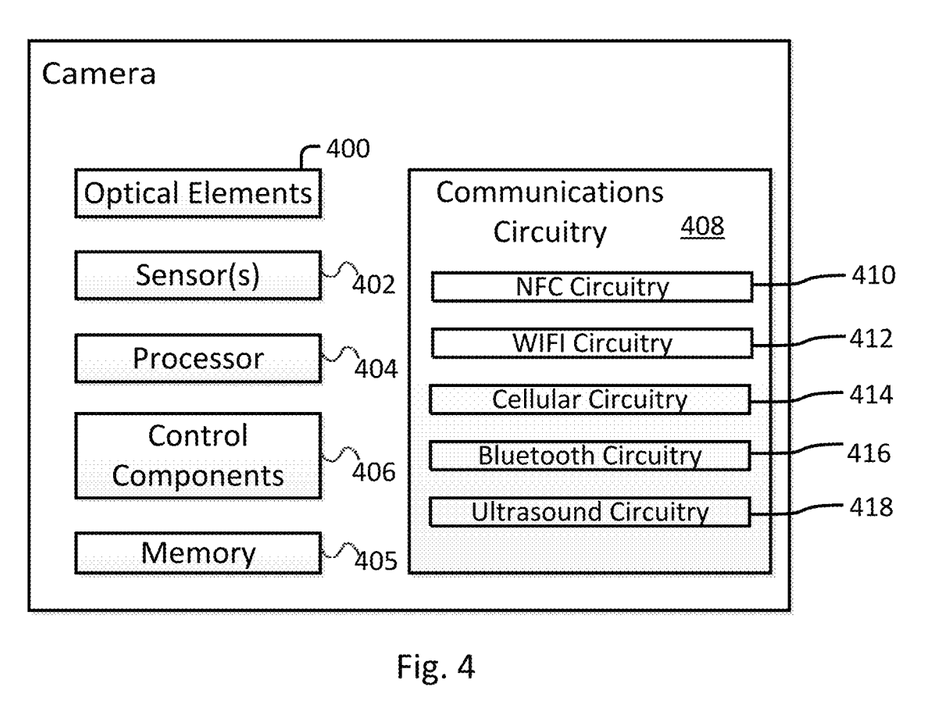
FIG. 4 is a block diagram of an illustrative network camera having proximity-based communications circuitry in accordance with an embodiment of the disclosure.

As shown in FIG. 4, according to an embodiment, camera 114 may include components such as imaging components (e.g., optical elements 400 and one or more sensors 402), processor 404, memory 405, control components 406, and communications circuitry 408.

Sensor(s) 402 may include imaging sensors sensitive to light in one or more wavelength bands and/or other sensors (e.g., environmental sensors such as humidity, temperature, location, or other sensors). Imaging sensors may include a visible light sensor, a thermal infrared sensor, a long wavelength infrared (LWIR) sensor, a mid wavelength infrared (MWIR) sensor, a short wavelength infrared (SWIR) sensor, a near infrared (NIR) sensor, and/or one or more hybrid image sensors for capturing images in response to light in multiple different wavelength bands.

Imaging sensors may be arranged to receive light through one or more of optical elements 400. Optical elements 400 may include one or more lenses, filters, films, gratings, prisms, beam splitters, or other suitable optical elements for filtering, focusing, zooming, and/or otherwise blocking, passing, processing, and/or directing light onto one or more of sensors 402.

Processor 404 may be implemented as any appropriate processing device (e.g., logic device, microcontroller, processor, application specific integrated circuit (ASIC), or other device) that may be used by camera 114 to execute appropriate instructions, such as software instructions stored in memory 405.

Memory 405 may include one or more memory devices (e.g., memory components) that store data and information, including image data (e.g., including video data), audio data, network information, camera information, and/or other types of sensor data, and/or other monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 405 may include a portable memory device that can be removed from camera 114 and used to convey stored data to other systems. In some embodiments, processor 404 may be configured to execute software instructions stored on memory 405 to perform various methods, processes, or operations in the manner described herein.

Control components 406 may include one or more buttons, indicators (e.g., LEDs), keyboards, displays, trackballs, knobs, joysticks, and/or other type of user interface adapted to accept user input and/or provide user feedback.

As shown in FIG. 4, communications circuitry 408 may include circuitry for communicating with other devices using various communications protocols. As examples, communications circuitry that may be included in a camera such as a network camera may include proximity-based communications circuitry such as, for example, near field communications (NFC) circuitry 410 and/or ultrasound circuitry 418 and optionally relatively wide area communications circuitry such as, for example, wireless network (WiFi®) circuitry 412, cellular circuitry 414, and/or Bluetooth® circuitry 416.

NFC circuitry 410 may include a powered or unpowered NFC integrated circuit that generates, receives, and/or processes communication signals according to radio-frequency identification (RFID) standards such as the ISO/IEC 14443, ISO/IEC 18092 or FeliCa standards (as examples). Cellular circuitry 414 may include a modular cellular component that generates, receives, and/or processes communications signals over one or more cellular data networks. Bluetooth® circuitry 416 may include a wireless communication component that generates, receives, and/or processes communications signals based on, for example, the Bluetooth® standard.

Ultrasound circuitry 418 may include a high-frequency microphone and a high-frequency speaker for sending and receiving sound-based signals at a frequency (e.g., greater than 14 kHz or greater than 19 kHz) that is inaudible to the human ear. Ultrasound circuitry 418 may, for example, be implemented as some or all of proximity-based communications circuitry for camera 114 that generates ultrasound signals at a volume that can only be detected within a given distance (e.g., within distance D of FIG. 2 or a distance of less than between 20 cm and 30 cm) of another device such as a user device having corresponding ultrasound communications circuitry. In various embodiments, proximity-based communications circuitry for a camera such as camera 114 may include any suitable combination of NFC circuitry 410, ultrasound circuitry 418 or other suitable proximity-based communications circuitry.

In various embodiments, communications circuitry 408 may include other appropriate short range wireless communication standards circuitry, a wireless broadband component (e.g., based on WiMax technologies), a wireless satellite component, or other appropriate wireless communication components. Communications circuitry 408 may also be configured for a proprietary wireless communication protocol and interface based on radio frequency (RF), microwave frequency (MWF), infrared frequency (IRF), and/or other appropriate wireless transmission technologies. Communications circuitry 408 may include one or more antennas for wireless communication purposes. Thus, in one example, communications circuitry 408 may handle, manage, or otherwise facilitate wireless communication by establishing wireless communication links to a wireless router, hub, or other appropriate wireless devices.

Communications circuitry 408 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 408. Communications circuitry 408 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

When user device 106 is within the proximity of camera 114, information such as camera information may be transmitted to user device 106. The camera information may be used by the user device to establish communications through local network device 104 or directly with the camera so that the user device may receive video from, provide control signals to, or otherwise interact with the camera when the user device is no longer within the proximity of the camera. For example, as shown in FIG. 5, camera 114 may be added to a list of cameras that are accessible by user device 106 when user device 106 is moved within the proximity of camera 114.

Figure 5:
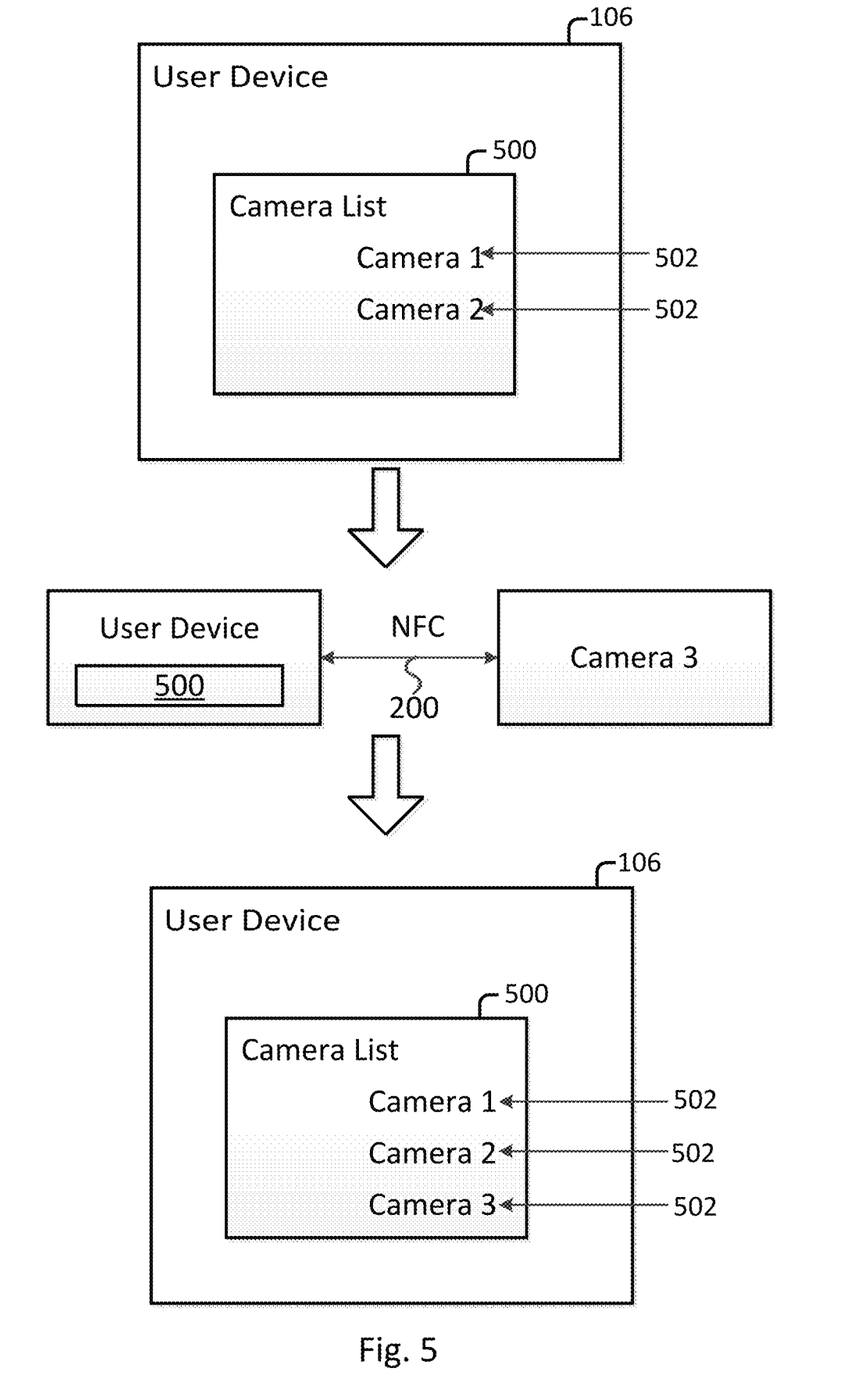
FIG. 5 is a flow diagram illustrating how a camera may be added to a list on a mobile device using proximity-based communications in accordance with an embodiment of the disclosure.

In the example of FIG. 5, user device 106 includes a camera list 500 listing cameras 502 (e.g., cameras with camera names "CAMERA 1" and "CAMERA 2"). Cameras 502 on list 500 may be cameras to which user device 106 currently has access to and/or previously set up cameras in a system such as system 100 of FIG. 1. In one embodiment, a user of user device 106 may be provided with the ability to select one or more cameras 502 from list 500 and obtain video, still images, other sensor data, status data, or other information from the selected camera, and/or provide control signals for controlling the position, status, or other aspects of the operation of the selected camera.

When it is desired to set up a new camera (e.g., to install a new camera or reinstall a previously connected camera in a system), the user device may be moved within the proximity of the new camera (e.g., camera 114 with a camera name such as "CAMERA 3"). As shown in FIG. 5, after proximity-based communications 200 have been exchanged between user device 106 and camera 114 while user device 106 is within the proximity of camera 114, camera 114 (e.g., "CAMERA 3") may appear in the list of cameras 502 in camera list 500 on user device 106. The operations of installing the camera in the system (e.g., by connecting the camera to a network and/or directly to a user device and adding the camera to the list of available cameras in a camera list on the user device) may appear seamless to the user and thereby provide the advantage over conventional camera systems of allowing setting up the camera, connecting the camera to the network, and providing access to the camera without requiring the user to locate, remember, and/or enter any information manually and hence providing the easy to set up capability that consumers have come to expect.

The example of FIG. 5 in which a camera is added to an existing list of cameras is merely illustrative. In some embodiments, a camera that is set up using proximity-based communications as described herein may be the first camera to be connected to the system and a new camera list including only that first camera may be generated to provide access to the camera from the user device.

Figure 6:
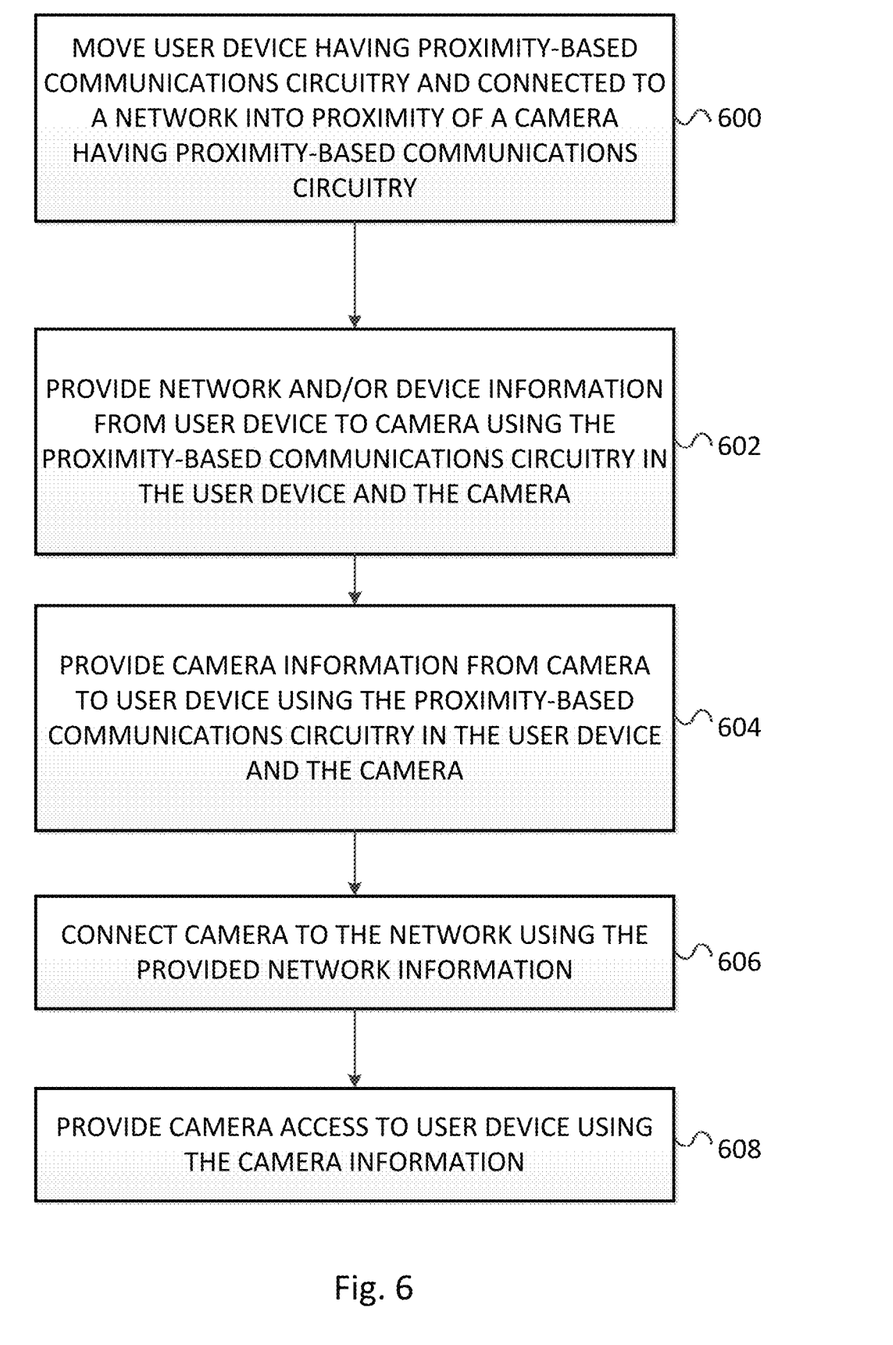
FIG. 6 is a flow chart of illustrative operations that may be performed for camera setup using proximity-based communications in accordance with an embodiment of the disclosure.

FIG. 6 is a flowchart of illustrative operations that may be performed for setting up a network camera using proximity-based communications.

At block 600, a user device having proximity-based communications circuitry and that is connected to a network may be moved into proximity of a camera having proximity-based communications circuitry capable of one or two-way exchange of information with the proximity-based communications circuitry of the user device.

At block 602, network and/or device information may be provided from the user device to the camera using the proximity-based communications circuitry in the user device and the camera. The network and/or device information may be provided while the user device is within the proximity of the camera.

At block 604, camera information may be provided from the camera to the user device using the respective proximity-based communications circuitry. The camera information may be provided while the user device is within the proximity of the camera.

At block 606, the camera may be connected to the network using the provided network information. For example, the camera may provide connection information from the network information to a network device such as a local network device (e.g., a router or a modem) according to an embodiment.

At block 608, access to the camera (e.g., access to images captured by the camera and/or control access to the camera) may be provided to the user device using the camera information. Providing access to the camera may include adding the camera to a camera list on the user device, generating a new camera list with the camera on the user device, providing access to streaming and/or recorded video from the camera or from a remote server or stored on cloud-based storage, or otherwise allowing and/or facilitating access to the camera.

Figure 7:
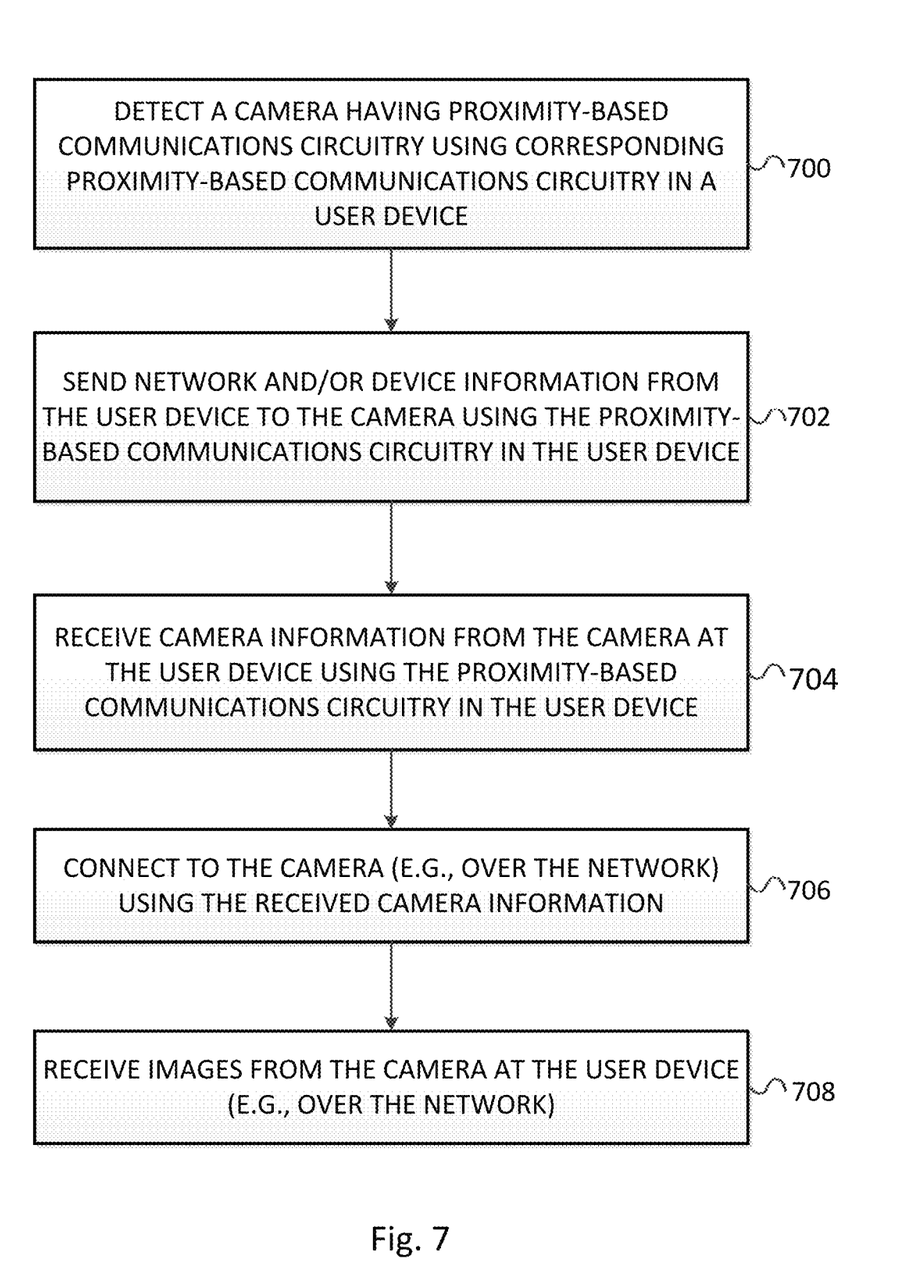
FIG. 7 is a flow chart of illustrative operations that may be performed by a mobile device for camera setup using proximity-based communications in accordance with an embodiment of the disclosure.

FIG. 7 is a flowchart of illustrative operations that may be performed by a user device for setting up a network camera using proximity-based communications.

At block 700, a camera having proximity-based communications circuitry may be detected by a user device using corresponding proximity-based communications circuitry in the user device. Detecting the camera may include determining that the camera is within a suitable distance for proximity-based communications, using the proximity-based communications circuitry. For example, an application associated with the camera may be running on the user device or may be activated when the user device is moved within close proximity of the camera. The application may utilize the proximity-based communications circuitry to detect the camera.

At block 702, network and/or device information may be sent from the user device to the camera using the proximity-based communications circuitry in the user device.

At block 704, camera information may be received from the camera at the user device using the proximity-based communications circuitry in the user device.

At block 706, the user device may connect to the camera (e.g., over a network to which the camera has connected using the sent network and/or device information) using the received camera information according to an embodiment. Connecting to the camera may include receiving information over the network indicating that the camera is connected to the network and available for communication over the network.

At block 708, images such as video images (and/or other information) may be received from the camera at the user device. The received images may be stored, retransmitted, and/or displayed to a user on a display of the user device.

Figure 8:
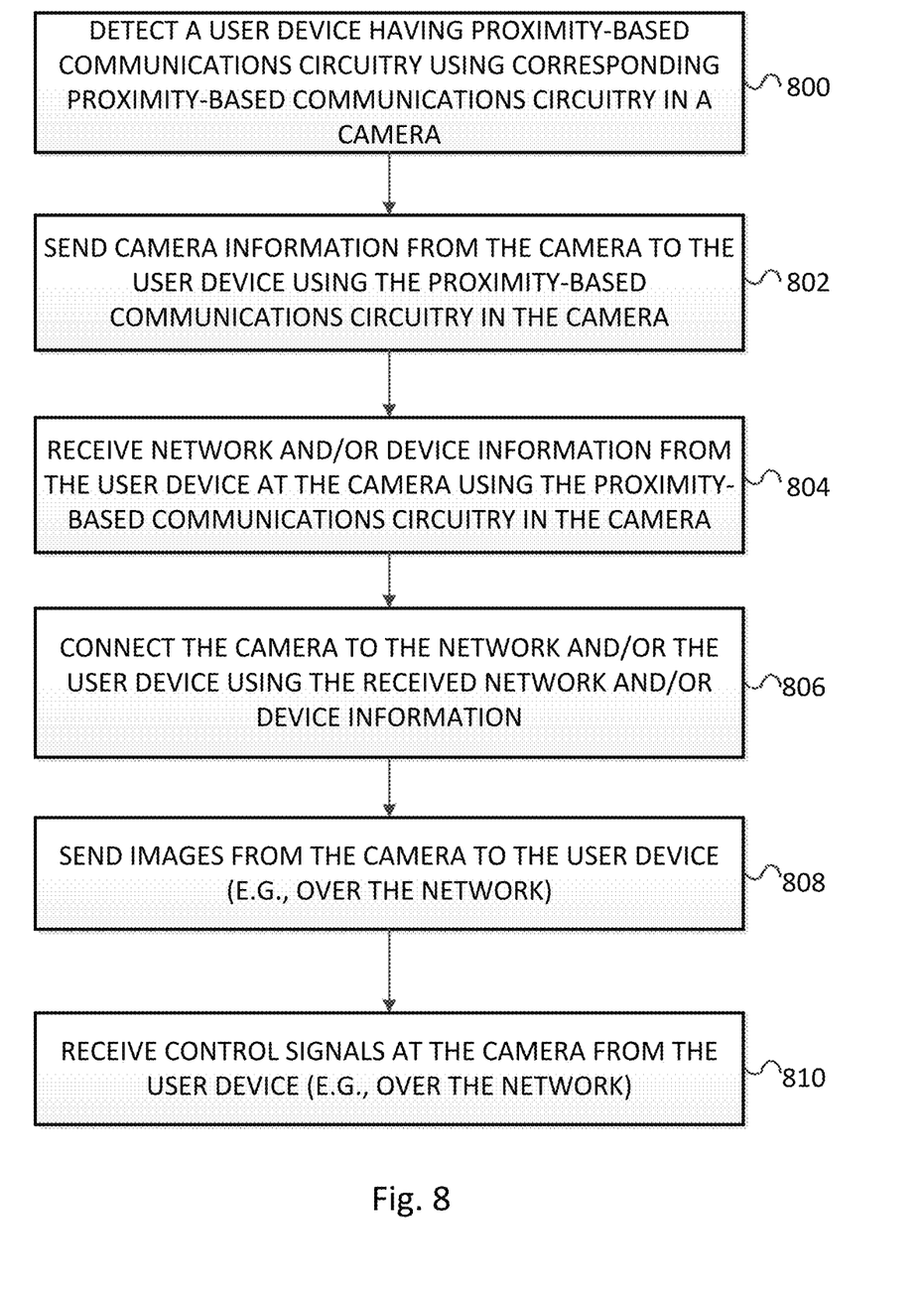
FIG. 8 is a flow chart of illustrative operations that may be performed by a network camera for camera setup using proximity-based communications in accordance with an embodiment of the disclosure.

FIG. 8 is a flowchart of illustrative operations that may be performed by a network camera for setting up the network camera using proximity-based communications.

At block 800, a user device having proximity-based communications circuitry may be detected by a camera (e.g., a network camera that is not yet connected to or is disconnected from the network) using corresponding proximity-based communications circuitry in the camera. Detecting the user device may include determining that the user device is within a suitable distance for proximity-based communications, using the proximity-based communications circuitry in the camera.

At block 802, camera information may be sent from the camera to the user device using the proximity-based communications circuitry in the camera.

At block 804, network and/or device information may be received at the camera from the user device using the proximity-based communications circuitry in the camera.

At block 806, the camera may connect to the network and/or the user device using the received network and/or device information. Connecting the camera to the network may include receiving a request for network connection information from a network device such as a local network device and providing the network connection information to the network device to establish a connection to the network.

At block 808, images such as video images (and/or other information) may be sent from the camera to the user device (e.g., over the network and/or directly).

At block 810, control signals (e.g., image processing control signals, camera operation and/or pointing control signals, data transmission signals, data recording signals, and/or other control signals for controlling the operation of the camera) may be received at the camera from the user device (e.g., over the network).

Figure 9:
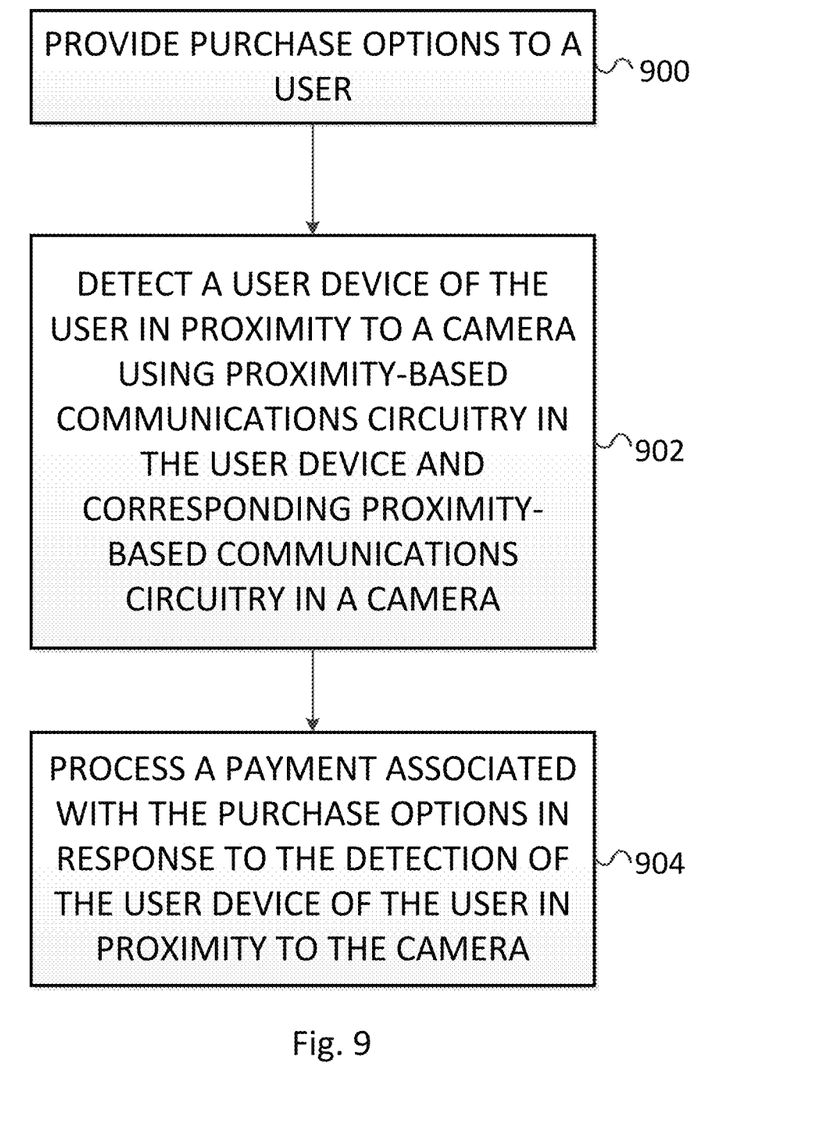
FIG. 9 is a flow chart of illustrative operations that may be performed for processing purchase operations using proximity-based communications with a camera in accordance with an embodiment of the disclosure.

In some embodiments, other interactions between a user device and a camera (e.g., operations performed after a camera has already been set up using proximity-based communication) may also optionally be performed using proximity-based communications between the user device and the camera. Other interactions may include purchase interactions, third-party pairing interactions, software, firmware, and/or hardware update or upgrade interactions, service plan update interactions, and/or other processes that can be initiated, processed, and or completed by proximity-based communications with a camera. For example, camera firmware may be updated even in scenarios in which the camera is not connected to a network by loading a firmware update onto a user's mobile device, moving the mobile device into the proximity of the camera, and transferring the firmware update to the camera using proximity-based communications (e.g., NFC communications) between the camera and the mobile device. It is contemplated that firmware updates for other devices other than cameras may also be provided in this manner. FIG. 9 is a flow chart of illustrative operations that may be performed for facilitating other interactions such as purchase interactions between a user device and a camera.

At block 900, one or more purchase options may be provided to a user. The purchase options may include options for purchasing (at a cost or at no cost) software updates, hardware updates, hardware additions or accessories or other products or services. The purchase options may be sent to a user device such as mobile device from camera and/or from a server associated with the camera.

At block 902, the user device that has received the purchase options and having proximity-based communications circuitry may be detected by a camera using corresponding proximity-based communications circuitry in the camera. Detecting the user device may include determining that the user device is within a suitable distance for proximity-based communications, using the proximity-based communications circuitry (e.g., when the user moves the user device to within the proximity and/or touches or taps the user device to the camera).

At block 904, a payment associated with the purchase options may be processed in response to the detection of the user device of the user in the proximity of the camera. For example, by tapping the user's smartphone against the camera, the user may accept a purchase offer and any required payment for the accepted offer may be automatically processed in response to the tapping. In this way, camera and/or system updates and upgrades may be obtained and/or paid for with minimal effort by the user. In some embodiments, no payment may be required (e.g., for a free software upgrade or update). In these payment-free operations, tapping the user device or moving the user device into proximity of the camera may initiate the payment-free operation (e.g., by instructing the camera, the server, and/or the user device to begin downloading the software update).

Figure 10:
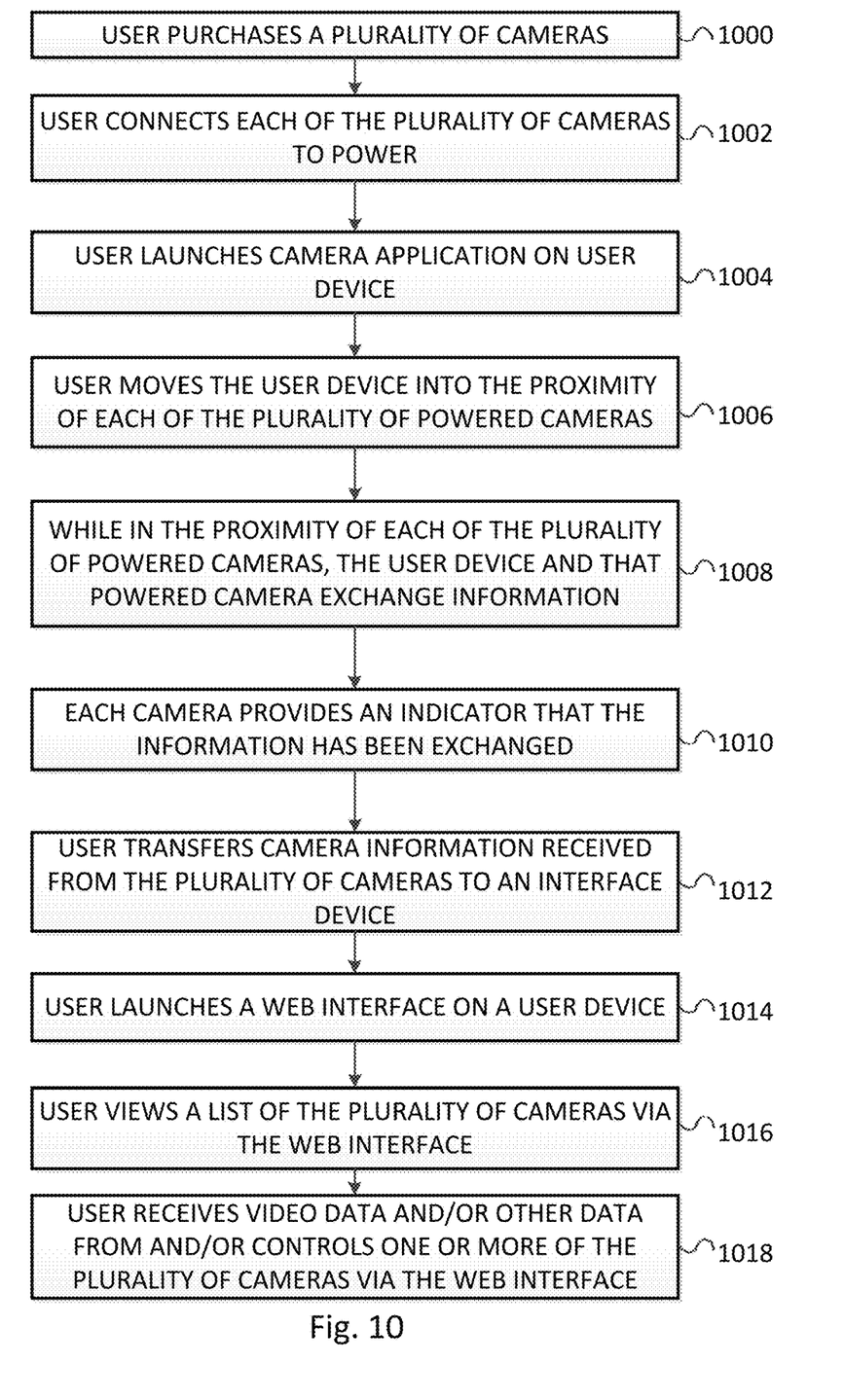
FIG. 10 is a flow chart of illustrative operations that may be performed for an exemplary use case of a system with a plurality of network cameras in accordance with an embodiment of the disclosure.

FIG. 10 is a flow chart of illustrative operations that may be performed in an exemplary use case for a system with network cameras and remote network video recording in accordance with an embodiment.

At block 1000, a user may purchase a plurality of cameras such as network cameras (e.g., one, two, three, four, five, six, seven, eight, or more than eight cameras).

At block 1002, the user may connect each of the plurality of cameras to power (e.g., by installing batteries in the camera and/or by plugging the camera into wired power supply such as a wall socket).

At block 1004, the user may launch a camera application such as a camera setup app on a user device such as a mobile device.

At block 1006, the user may provide (e.g., by moving the mobile device) the user device into the proximity of each of the plurality of powered cameras (e.g., one by one).

At block 1008, while the user device is in the proximity of each of the plurality of powered cameras, the user device and that powered camera may exchange information (e.g., using proximity-based communications circuitry in the camera and the user device). For example, network information as, for example, described herein may be provided from the user device to the camera and/or camera information such as a unique ID, a serial number, a model number, or other camera-related information may be provided from the camera to the user device.

At block 1010, each camera may provide an indicator such as a sound, a flashing light or other indicator that the information required for setup of the network camera has been successfully exchanged.

At block 1012, the user may transfer the camera information received from each of the plurality of cameras to an interface device such as an NVR or an NVR reader. The user may transfer the camera information to the interface device using a wired or wireless (e.g., proximity-based) connection between the user device and the interface device. The interface device may store the camera information and/or provide the camera information to a remote server or storage server for facilitating remote, network-accessible storage of camera data at the remote server or storage server.

At block 1014, the user may launch a web interface on a user device. The user device on which the web interface is launched may be the same user device that was used for setup operations at blocks 1004-1012 or may be a different portable or stationary user device.

At block 1016, the user may view a list of the plurality of cameras via the web interface. For example, the web interface may provide access to a list of the plurality of cameras stored on the interface device and/or a list of the plurality of cameras stored at a remote server or storage server.

At block 1018, the user may receive video data and/or other data from one or more of the plurality of cameras at the user device via the web interface and/or provide control signals to one or more of the plurality of cameras from the user device via the web interface.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A network camera comprising:
proximity-based communications circuitry configured to provide a proximity-based communication with a user device within a proximity of the network camera, wherein the network camera is configured to receive information from the user device via the proximity-based communication to establish a connection with a local network device that is physically separate from the user device;
network communications circuitry configured to interface with the local network device; and
a network camera processor configured to establish the connection to the local network device via the network communications circuitry using information received from the user device by the proximity-based communication via the proximity-based communications circuitry, wherein the user device is configured to connect to the local network device to exchange communications with the network camera after the network camera has connected to the local network device, and wherein the local network device is configured to establish a local area network.

2. The network camera of claim 1, wherein the proximity-based communications circuitry comprises Near Field Communications circuitry, wherein the local network device comprises a wireless wide area network, and wherein the network communications circuitry of the network camera is configured to communicate with the user device over the wireless wide area network.

3. The network camera of claim 1, wherein the information comprises a service set identifier of the local network device.

4. The network camera of claim 1, further comprising a networked server, wherein the camera processor is further configured to provide camera information to the user device via the proximity-based communications circuitry comprising an address of the networked server.

5. The network camera of claim 1, wherein the network camera is configured to connect to the user device through the local network device when the connection is established, wherein the network camera is configured to provide video images and/or image frame data to the user device over the local network device, and wherein the user device is configured to provide position control signals and/or data recording signals to the network camera over the local network device.

6. The network camera of claim 1, wherein the information is received from the user device via the proximity-based communications circuitry when the user device is within the proximity of the proximity-based communications circuitry.

7. The network camera of claim 1, wherein the proximity comprises a space within which the proximity-based communications circuitry of the camera is capable of sending and receiving signals by the proximity-based communication to and from corresponding proximity-based communications circuitry of the user device.

8. The network camera of claim 1, wherein the proximity comprises a space within a distance of ten centimeters from the network camera.

9. The network camera of claim 1, further comprising an imaging sensor sensitive to light in one or more wavelength bands and arranged to receive the light through one or more optical elements.

10. A system comprising the network camera and the user device of claim 1, wherein the user device comprises proximity-based communications circuitry configured to provide the information to the proximity-based communications circuitry of the network camera by the proximity-based communication and to receive camera information from the proximity-based communications circuitry of the network camera.

11. A method of using the network camera of claim 1, the method comprising:
providing the user device within the proximity of the camera;
exchanging proximity-based communication between the user device and the network camera responsive to the providing and while the user device is within the proximity of the camera;
performing setup operations in response to the exchanging; and
establishing the connection to the local network device that is physically separate from the user device, via the network communications circuitry of the network camera, using the information received from the user device by the proximity-based communication via the proximity-based communications circuitry, wherein the user device connects to the local network device to exchange communications with the network camera after the network camera has connected to the local network device, and wherein the local network device is configured to establish a local area network.

12. The method of claim 11, wherein the exchanging comprises providing network information associated with the local network device from the user device to the network camera, and wherein performing the setup operations comprises connecting the network camera to the local network device using the network information.

13. The method of claim 12, wherein the exchanging further comprises providing camera information from the network camera to the user device prior to the establishing the connection to the local network device, wherein the camera information comprises an address of a networked server.

14. The method of claim 13, further comprising providing video images and/or image frame data to the user device from the network camera over the local network device.

15. The method of claim 14, wherein the local network device comprises a wireless local area network and wherein the providing of the user device within the proximity of the network camera comprises tapping the network camera with the user device.

16. The method of claim 11, further comprising adding the network camera to a list of cameras on the user device.

17. The method of claim 11, further comprising:
providing a purchase option to a user with the user device;
wherein the performing comprises performing a purchase operation; and
wherein performing the purchase operation comprises processing a payment associated with the purchase option.

18. A method, comprising:
detecting a user device within a proximity of a network camera using proximity-based communications circuitry in the network camera;
exchanging information between the network camera and the user device by proximity-based communication responsive to the detecting and while the user device is within the proximity of the network camera using the proximity-based communications circuitry;
establishing a connection to a local network device physically separate from the user device, by network communications circuitry of the network camera, using information received from the user device by the proximity-based communication via the proximity-based communications circuitry; and
sending images from the network camera to the user device over the local network device, wherein the user device connects to the local network device to exchange communications with the network camera after the network camera has connected to the local network device, and wherein the local network device is configured to establish a local area network.

19. The method of claim 18, wherein the exchanging comprises:
receiving network information from the user device at the network camera by the proximity-based communication with the proximity-based communications circuitry; and
sending camera information to the user device from the network camera with the proximity-based communications circuitry.

20. The method of claim 18, wherein the proximity-based communications circuitry comprises Near Field Communications circuitry, wherein the local network device comprises a wireless wide area network, and wherein the network communications circuitry of the network camera is configured to communicate with the user device over the wireless wide area network.

* * * * *